(12) United States Patent
Spotanski et al.

(10) Patent No.: US 11,501,208 B2
(45) Date of Patent: Nov. 15, 2022

(54) REHEARSAL-BASED PRESENTATION ASSISTANCE

(71) Applicant: Microsoft Technology Licensing, LLC, Redmond, WA (US)

(72) Inventors: James Patrick Spotanski, Seattle, WA (US); Daniel Y. Parish, Seattle, WA (US); Tracy ThuyDuyen Tran, Seattle, WA (US); Ling Lu, Mill Creek, WA (US); Kiruthika Selvamani, Bellevue, WA (US); Carlos Esteban Lopez Rivas, Seattle, WA (US); Ajitesh Kishore, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 527 days.

(21) Appl. No.: 16/591,346

(22) Filed: Oct. 2, 2019

(65) Prior Publication Data

US 2021/0103851 A1 Apr. 8, 2021

(51) Int. Cl.
*G06N 20/00* (2019.01)
*G06F 40/30* (2020.01)
*G06V 40/20* (2022.01)

(52) U.S. Cl.
CPC .......... *G06N 20/00* (2019.01); *G06F 40/30* (2020.01); *G06V 40/20* (2022.01)

(58) Field of Classification Search
CPC ......... G06N 20/00; G06F 40/30; G06V 40/20
See application file for complete search history.

(56) References Cited

U.S. PATENT DOCUMENTS

| | | | |
|---|---|---|---|
| 2007/0171201 A1* | 7/2007 | Pi | G08C 17/00 345/157 |
| 2015/0095785 A1* | 4/2015 | Edge | G06F 3/0481 715/731 |
| 2015/0132735 A1* | 5/2015 | Edge | G09B 5/06 434/308 |
| 2016/0049094 A1* | 2/2016 | Gupta | G10L 25/03 434/185 |
| 2018/0060028 A1 | 3/2018 | Carr et al. | |
| 2018/0122371 A1 | 5/2018 | Vangala et al. | |
| 2018/0129634 A1* | 5/2018 | Sivaji | G06F 40/103 |
| 2019/0129591 A1 | 5/2019 | Anders et al. | |
| 2019/0129592 A1* | 5/2019 | Anders | G06F 40/284 |
| 2019/0318010 A1* | 10/2019 | Tamir | G06F 16/4393 |
| 2020/0105251 A1* | 4/2020 | Meshram | G10L 15/083 |

(Continued)

OTHER PUBLICATIONS

"Discover Disrupt SF 2019—Startups Start Here", Retrieved From: https://techcrunch.com/, Jul. 18, 2019, 7 Pages.

(Continued)

*Primary Examiner* — Beau D Spratt
(74) *Attorney, Agent, or Firm* — Alleman Hall Creasman & Tuttle LLP

(57) ABSTRACT

Examples are disclosed that relate to providing transition-related assistance during a presentation. One example provides a method comprising, during a rehearsal of a presentation, receiving content of the presentation. Based on the content received, a transition within the presentation is determined via a machine learning model. During a performance of the presentation, the transition is automatically enacted.

20 Claims, 11 Drawing Sheets

(56) References Cited

U.S. PATENT DOCUMENTS

2020/0201598 A1* 6/2020 Topaloglu ............ G10L 15/1807

OTHER PUBLICATIONS

"Presenter Coach in PowerPoint for the Web", Retrieved From: https://www.youtube.com/watch?v=Zx56ra4XtXM, Retrieved on: Sep. 17, 2019, 2 Pages.
"Application as Filed in U.S. Appl. No. 16/548,233", filed Aug. 22, 2019, 54 Pages.
Franklin, et al., "Jabberwocky", In Proceedings of the 5th International Conference on Intelligent user Interfaces, Jan. 9, 2000, pp. 98-105.
"International Search Report and Written Opinion Issued in PCT Application No. PCT/US20/040387", dated Sep. 24, 2020, 14 Pages.

* cited by examiner

REHEARSAL-BASED PRESENTATION ASSISTANCE

BACKGROUND

Presentation programs allow a presenter to perform a variety of transitions while presenting images, text, audio, videos, and/or other presentation data during a presentation. Transitions such as advancing to a next slide or later portion of the presentation, returning to a previously viewed portion of the presentation, initiating animations, and controlling playback of media elements may be accomplished via manual user inputs (e.g. via an input device) performed by the presenter or another person assisting the presenter.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are disclosed that relate to methods and computing systems for providing transition-related assistance during a presentation. One example provides a method comprising, during a rehearsal of a presentation, receiving content of the presentation. Based on the content received, a transition within the presentation is determined via a machine learning model. During a performance of the presentation, the transition is then automatically enacted.

Another example provides a method of training a machine learning model. During a rehearsal of a presentation, one or more of image data, audio data, and textual data is received, and a user input specifying a transition within the presentation is received. Using the one or more of the image data, the audio data, and the textual data, a transition trigger associated with the transition is determined. The machine learning model is trained by inputting the transition trigger and the transition as training data to the machine learning model.

DETAILED DESCRIPTION

Figure 1A:
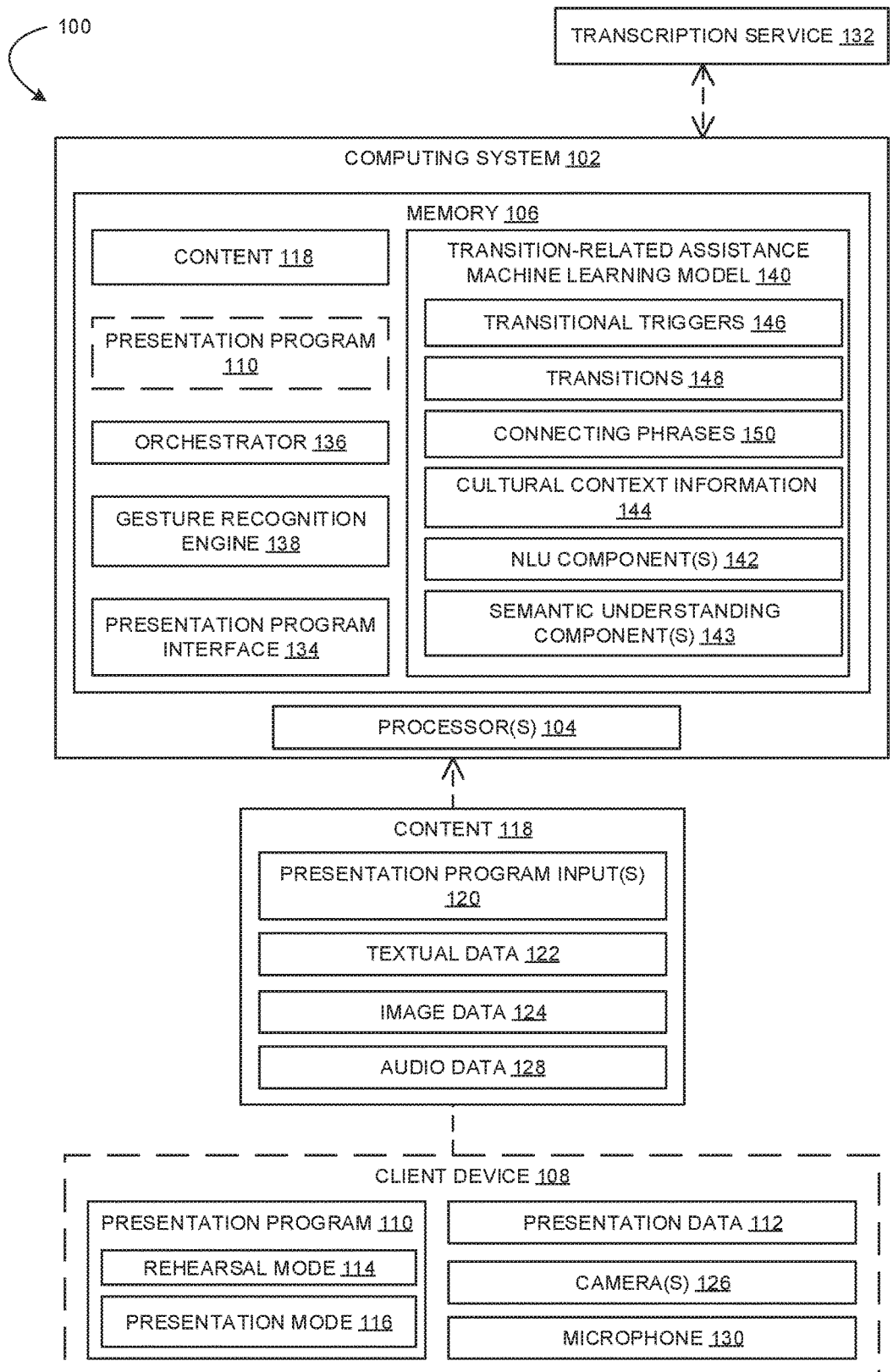
FIG. 1A shows a block diagram illustrating an example system for providing transition-related assistance during a presentation according to examples of the present disclosure.

Presentation programs allow a presenter to display images, text and/or videos during a presentation. As mentioned above, presentation programs also allow a presenter to perform various transitions within a presentation, such as navigating to a next slide, a previous slide, or other portion of the presentation, initiating an animation, controlling playback of a media element, and/or emphasizing an object (e.g. a graph, chart, text, image, etc.) displayed as part of the presentation. In existing presentation programs, a presenter may use a presenting device (a computer, laptop, tablet, etc.) or an accessory device (a mouse, trackpad, hand-held clicker, etc.) to manually control transitions within a presentation.

Performing manual inputs to enact transitions may be cumbersome and disruptive during a presentation. For example, during a presentation that includes a media element (audio and/or video), it may be necessary for a user to direct their attention away from an audience and towards their presenting device to manually initiate playback of the media element. This may detract from the user engagement with the audience and may perceptibly interrupt a speech or body language component of the presentation. Controlling a presentation via manual input modalities also may be burdensome for presenters with impaired mobility. Furthermore, memorizing all transitions within a presentation and corresponding cues at which to enact a transition, possibly in addition to a presentation script, may increase the complexity and stress associated with preparation and delivery of the presentation.

A person other than the presenter may relieve the presenter from manually enacting transitions during a presentation, e.g. by operating the presenting device and/or accessory device on their behalf. However, the presenter may still occasionally cue the other person to enact a specified transition, to provide feedback regarding whether a transition enacted by the other person was correct, etc. Such cues may be distracting for the presenter and/or the audience. Further, this approach requires the time and attention of another person who assists with the performance of the presentation, which may not be feasible in various scenarios.

Accordingly, the examples disclosed herein relate to automated techniques for enacting transitions within presentations. Briefly, a transition-related assistance machine learning model is trained to provide transition-related assistance during a presentation based on one or more rehearsals of the presentation. During a rehearsal of a presentation by a user, the machine learning model receives content of the presentation and uses the content received to associate transitional triggers (spoken phrases, gestures, bodily movements, and/or other user signals) with specified or detected transitions within the presentation. During a performance of the presentation after one or more rehearsals, the machine learning model uses detected transitional triggers to automatically enact the transitions within the presentation on behalf of the user.

In this manner, the automatic transitions disclosed herein free a user or their assistant from the burden of manually or otherwise explicitly controlling a computing device or accessory to initiate transitions during a performance of a presentation. As used herein, the term "transition" refers to a navigation to a next slide or image(s), a previous slide or image(s), or to another portion of the presentation, activating a media control element (e.g., an audio/video play or pause control) within the presentation, displaying an emphasis or visual effect applied to a displayed object within the presentation, displaying an animation, broadcasting audio, or any other video or audio action enacted via a presentation program.

FIG. 1A depicts an example system 100 for providing transition-related assistance to a presenter. The system includes a computing system 102 comprising one or more processors 104 and memory 106 storing instructions executable by the processor(s) 104 to provide transition-related assistance during a presentation as described herein. In some examples, the computing system 102 may be implemented as one or more network servers. In a more specific example, the computing system 102 may be configured to provide transition-related assistance as a network-based or cloud service to one or more connected devices.

In other examples, the computing system 102 may be implemented as an edge computing device, a personal computing device (e.g. a laptop, a tablet, etc.), a mobile computing device, or any other suitable computing device. Further, aspects of the computing system 102 may be distributed across one or more computing devices. For example, a cloud service provider may operate two or more servers, each of which may perform separate aspects of the computing system 102. Additional details regarding the components and computing aspects of the computing system 102 are described in more detail below with reference to FIG. 8.

Figure 2A:
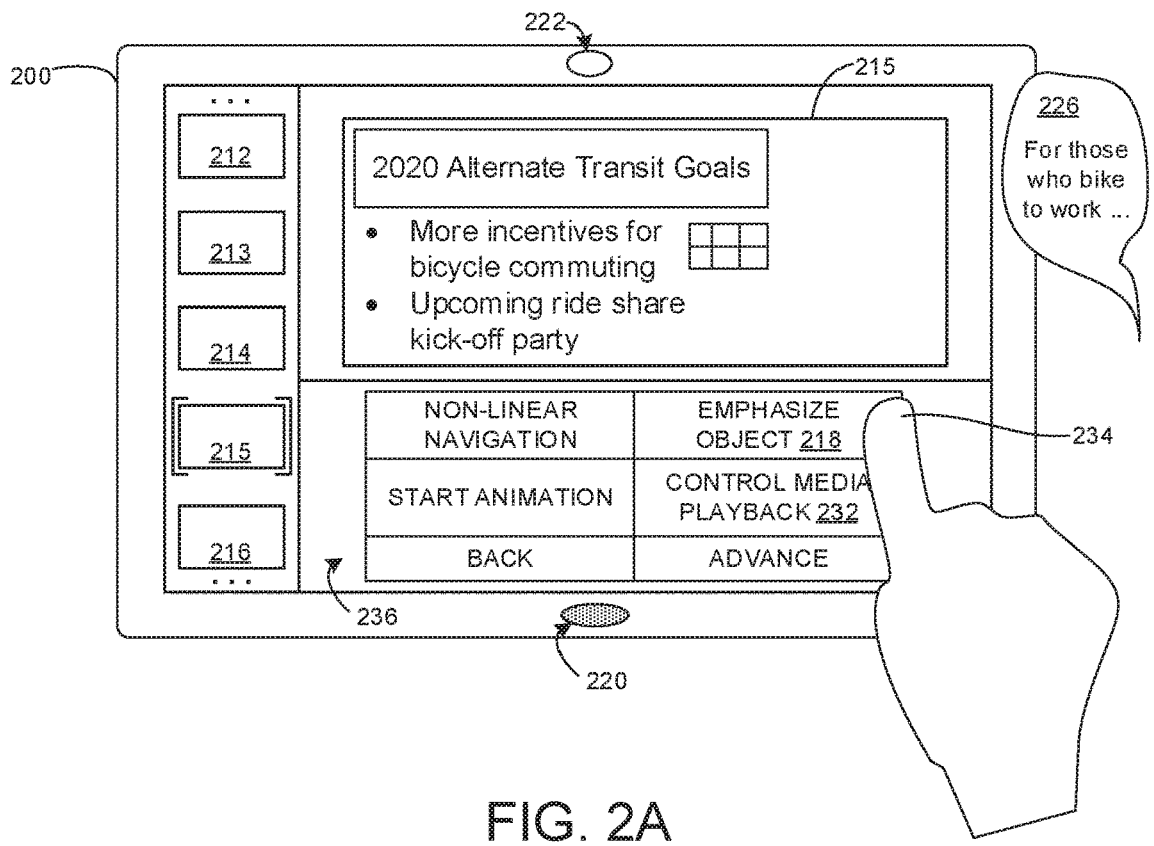
FIGS. 2A-2B schematically show an example use scenario in which a user rehearses a presentation according to examples of the present disclosure.

As described in the use case examples provided below, the computing system 102 may be communicatively coupled with a client device 108 via a network, such as a local area network (LAN) or the Internet. The client device 108 may be a user computing device, such as a laptop, a tablet, or a smartphone that is operated by a presenter. FIGS. 2A-2D depict one example of a client device 108 in the form of a tablet device 200 used by a presenter to rehearse a presentation (FIGS. 2A-2B) and deliver the presentation to an audience (FIGS. 2C-2D).

Returning to FIG. 1A, the client device 108 is configured to execute a presentation program 110. The presentation program 110 may take any suitable form. For example, the presentation program 110 may comprise instructions stored in a memory of the client device 108. In other examples, the presentation program 110 may comprise a web-based application that is executed via a web browser. In these examples, the web-based presentation program 110 may be controlled to generate and provide video and/or audio output to the client device 108.

The presentation program 110 may include a plurality of features for creating and editing presentation data 112 for a presentation. The presentation data 112 may include visual data (slides of a slideshow, a video montage, a compilation of motion graphics, animation data, images, graphs, charts, etc.) and audio data for audio elements (sound effects, music clips, etc.). The term "presentation" as used herein refers to presentation data 112 presented by a user via a presentation program and the voice and/or physical actions of a presenter during a rehearsal or performance of presenting presentation data. Examples of physical actions include sign language, natural body language, gestures, and other movements of a person. Examples of voice input that may augment a presentation include spoken phrases and speech characteristics (speed, volume, intonations, inflections, etc.). In the example of FIGS. 2C-2D described below, the presentation comprises a slideshow that is displayed on a wall (e.g. via a projector) and augmented by voice, movements to different locations on the stage, and gestures of a presenter.

Returning to FIG. 1A, the presentation program 110 is operable in a rehearsal mode 114 that enables a presenter to rehearse a presentation, e.g. by outputting the presentation data 112 to a display(s), a speaker(s), and/or any other suitable output device(s). For example, the rehearsal mode 114 may include a plurality of features for displaying, navigating, and authoring the presentation data 112 while a user rehearses a script and/or delivers impromptu speaking content. In this context, the terms "script" and "speaking" may include use of a nonverbal language, such as American Sign Language, in addition or alternatively to verbal communication. While operating in the rehearsal mode 114, the presentation program 110 may be configured to provide on-screen guidance to a user. The on-screen guidance may take the form of real-time feedback provided to a user during a rehearsal session (e.g. via pop-up notifications), and/or may take the form of performance metrics provided upon a completion/termination of the rehearsal session. As described in more detail below, the presentation program 110 is also operable in a presentation mode 116 that enables a user to perform a presentation and automatically enacts transitions within the presentation via a transition-related machine learning model.

During a rehearsal of a presentation, the client device 108 receives content 118 of the presentation. In some examples, the content includes one or more presentation program inputs 120. Each presentation program input 120 comprises an explicit user input specifying a transition within the presentation. For example, while operating the presentation program 110 in the rehearsal mode 114, a user may manually advance the presentation to a later portion of the presentation or to a previous portion of the presentation. Likewise, during the rehearsal, the user may manually initiate or stop playback of a media element, select an object to emphasize with an emphasis (e.g. highlight, size enlargement, zoom, outline, underline, etc.), or initiate an animation within the presentation data 112.

The client device 108 may receive a presentation program input 120 comprising an explicit user input in any suitable manner. Examples of suitable input modalities include touch inputs (e.g. via a finger or stylus to a capacitive touch surface), keystrokes, button presses, and gaze (e.g. as determined via a determined gaze direction combined with a dwell duration and/or selection command).

The content 118 also may include presentation data 112, such as textual data 122, image data 124 and/or audio data 128. Textual data 122 may include text and/or image data obtained from a portion of the presentation. In one specific example, the textual data may include text and/or image data obtained from slides of a slideshow presentation. Before or during a rehearsal, the client device 108 may receive textual data 122 in any suitable manner. For example, the presentation program 110 may make the textual data 122 available to the client device 108 when a user saves a copy of the presentation data 112 (e.g. in a presentation file format). As another example, the client device 108 may obtain the textual data 122 from the presentation program 110 when the user opts-in to receive transition-related assistance, e.g. by operating the presentation program 110 in the rehearsal mode 114 and agreeing to share rehearsal data with a machine learning model.

The content 118 also may include image data 124. For example, the image data 124 may comprise image data of a user performing a rehearsal of a presentation. The client device 108 may receive the image data 124 in any suitable manner. In the example of FIG. 1A, the client device 108 receives image data 124 from one or more cameras 126, which may be integrated with or external to the client device 108. Each camera 126 acquires one or more images of a use environment. In some examples, the camera(s) 126 comprises one or more visible light cameras configured to capture visible light image data from the use environment. Example visible light cameras include an RGB camera and/or a grayscale camera. The camera(s) 126 also may include one or more depth image sensors configured to capture depth image data for the use environment. Example depth image sensors include an infrared time-of-flight depth camera and an associated infrared illuminator, an infrared structured light depth camera and associated infrared illuminator, and a stereo camera arrangement.

The content 118 also may include audio data 128, such as voice input from the presenter. In the example of FIG. 1A, the client device 108 comprises a microphone(s) 130 to capture voice input and other speech characteristics of the presenter. Any suitable microphone may be used, such as an internal microphone, an external microphone, or a microphone array.

It will be understood that aspects of the computing system 102 described herein may additionally or alternatively be implemented at the client device 108. Likewise, aspects of the client device 108 may additionally or alternatively be implemented at the computing system 102. In this manner and in different examples, any or all processes described herein may be practiced entirely locally at a client device, entirely remotely from the client device, or by any combination of local and remote devices.

In the example of FIG. 1A, the client device 108 is configured to transmit the content 118 to the computing system 102 via a network as described above. In some examples in which the content 118 includes audio data 128, the client device 108 may transmit the audio data 128 in the form of raw audio data. In other examples, the client device 108 may perform one or more processing tasks before transmitting the audio data 128 to the computing system 102. Example processing tasks include transforming the audio data into text via speech-to-text processing, compressing the audio data, performing noise processing, and/or processing input from a microphone array.

When the content 118 received by the computing system 102 includes audio data 128, the computing system 102 may route the audio data 128 to a transcription service 132. The computing system 102 may host the transcription service 132 locally or utilize a transcription service 132 provided by one or more devices other than the computing system 102. In other examples, aspects of the transcription service 132 may be distributed between the computing system 102 and the one or more other devices. In yet other examples, the transcription service 132 may receive the audio data 128 directly from the client device 108.

The transcription service 132 is configured to transcribe the audio data 128 into text or other suitable data structures (e.g. strings). The transcription service 132 may utilize any suitable speech recognition techniques to process the audio data 128 captured by the client device 108. In some examples, the audio data received by the transcription service 132 may be transformed by a feature extractor into data for processing by a speech recognition engine. A matrix of multiple feature vectors extracted by the feature extractor may be provided to the speech recognition engine for processing. The feature extractor may utilize any suitable dimensionality reduction techniques to process the audio data and generate feature vectors. Example techniques include using mel-frequency cepstral coefficients (MFCCs), linear discriminant analysis, deep neural network techniques, etc.

The speech recognition engine may compare the feature vectors with acoustic models for speech sounds (e.g., speech components). In some examples, the speech recognition engine may comprise an acoustic representation generator (e.g., acoustic modeler) that evaluates the similarity of a spoken utterance represented by one or more feature vectors to acoustic models of language sounds. The acoustic models may comprise data that matches pronunciations of speech components, such as phonemes, to particular words and/or phrases. The speech recognition engine also may compare the feature vectors and other audio data with sequences of sounds to identify words and/or phrases that match the spoken sounds of the audio data.

In some examples, the speech recognition engine may utilize Hidden Markov models (HMMs) to match feature vectors with phonemes and/or other speech components. Each state of an HMM may comprise a statistical distribution that is a mixture of diagonal covariance Gaussians, which may indicate a likelihood for each observed vector. Each phoneme or word may have a different output distribution. Individual HMMs for separate phonemes and words may be combined to create an HMM for a sequence of phonemes or words.

Using the speech recognition engine, feature vectors and other speech recognition data may be processed to generate recognized text, such as a real-time transcription of speech information received by client device 108. In other examples, any suitable techniques for matching feature vectors to phonemes and/or other speech components may be utilized, as well as other types and forms of speech recognition functionality.

In some examples, the transcription service 132 may operate in real-time or near-real-time during a rehearsal of a presentation and/or during a performance of a presentation. For example, the transcription service 132 may receive speech inputs from the presenter and output text in real-time as the presenter is speaking. As described in more detail below, output from the transcription service 132 may be analyzed by a transition-related assistance machine learning model 140 to determine one or more transitions within the presentation.

The computing system 102 comprises a presentation program interface 134 that receives and routes various inputs (e.g. content 118) from the client device 108 to modules of the computing system 102 and/or external services, such as the transcription service 132. For example, the presentation program interface 134 may route audio data 128 to the transcription service 132 and other content (presentation program inputs 120, textual data 122, image data 124, etc.) to an orchestrator 136. The presentation program interface 134 also may route data from various modules and external services to the client device 108.

The orchestrator 136 routes received content 118 to one or more appropriate modules of the computing system 102. The orchestrator 136 may also route one or more outputs to one or more destinations. For example, the computing system 102 may receive transcription output from the transcription service 132 via the orchestrator 136, and the orchestrator 136 may direct the transcription output to the client device 108 or to any applicable modules of the computing system 102 for further processing. For example, the orchestrator 136 may route audio data 128 and/or transcription output to the transition-related assistance machine learning model 140.

In addition or alternatively to audio data 128, the computing system 102 may process image data 124, such as still images and/or video, received during a rehearsal of a presentation to provide transition-related assistance to the user. For example, the orchestrator 136 may route received image data 124 to a gesture recognition engine 138. The gesture recognition engine 138 is configured to recognize people and/or other objects within an imaged scene, and determine whether an imaged person performs a gesture. The gesture recognition engine 138 may utilize a neural network(s), a convolution neural network(s), an object detection algorithm(s), a pose detection algorithm(s), and/or any other suitable architecture for identifying and classifying pixels of an image.

Pixels classified as belonging to a person may be compared among image frames captured at different times to detect motion of the person, for example based upon movement of an image component (pixel, voxel, etc.) or subset of image components being greater than a threshold. Detected motion may be analyzed to determine whether the detected motion represents a gesture, e.g. based upon whether the motion falls within allowable ranges of locations, velocities, acceleration, and/or other quantities defined for that gesture. In some examples, the gesture recognition engine 138 may apply a gesture filter defining allowable ranges for various parameters of a gesture to the detected motion, to determine whether the detected motion satisfies a gesture defined by the gesture filter.

The gesture recognition engine 138 may utilize one or more gesture libraries, which may be local to the computing system 102 or hosted remotely, to obtain gesture filters or other forms of gesture definitions. The gesture recognition engine 138 may provide output of its analysis to the transition-related assistance machine learning model 140 for further processing. Example outputs of the gesture recognition engine include an indication as to whether or not a gesture was performed, an indication of a gesture determined to be performed, and/or a confidence in the determination.

As mentioned above, the computing system 102 also may process presentation program inputs 120 and textual data 122 received during a rehearsal of a presentation to provide transition-related assistance to the user. When the content 118 received by the computing system 102 includes presentation program inputs 120 and/or textual content 122, the presentation program 110 may make such content available to the computing system 102 when a user saves a copy of the presentation data 112, when the user completes or terminates a rehearsal session, and/or when the user opts-in to receive transition-related assistance. In any instance, the computing system 102 directs the presentation program inputs 120 and/or the textual data 122 to the transition-related assistance machine learning model 140 for further processing.

As described in more detail below, the transition-related assistance machine learning model 140 is configured to provide transition-related assistance during a presentation based upon observations from one or more rehearsals of the presentation. During a rehearsal, the transition-related assistance machine learning model 140 receives content 118 of the presentation, which may be processed or partially processed by one or more modules of the computing system 102 as described above. Based at least on the content received, and as described in the use case examples provided below, the transition-related assistance machine learning model 140 determines a transition within the presentation.

The transition-related assistance machine learning model 140 includes one or more natural language understanding (NLU) components 142 that may receive audio data 128 of a user speaking or a transcribed representation of the audio data 128 from the transcription service 132 via the orchestrator 136. As described in more detail below, the transition-related assistance machine learning model 140 may use the NLU component(s) 142 to analyze the audio data 128, such as a voice input or a transcribed representation of the voice input, to identify transitional triggers 146 within the audio data 128.

The transition-related assistance machine learning model 140 also includes one or more semantic understanding component(s) 143, such as semantic parser(s), that may receive textual data 122 and analyze the textual data 122 using machine learning techniques, such as deep learning techniques. The semantic understanding component 143 may determine, for example, a semantic meaning associated with text and/or image data obtained from the presentation. As described in more detail below, the transition-related assistance machine learning model 140 may leverage semantic understanding of the textual data 122 to identify a transitional trigger associated with a transition and/or determine an alternate transitional trigger for the transition, e.g. such as a connecting phrase 150 for transitioning between different portions of a presentation.

The transition-related assistance machine learning model 140 also may include cultural context information 144, such as one or more culture-specific models of insensitive language, inappropriate gestures and/or body language, alternate phrasing for insensitive language, etc. As described in more detail below, the transition-related assistance machine learning model 140 may utilize the cultural context information 144 to recommend possible or alternate transitional triggers and/or transitions within a presentation.

In some examples, the transition-related assistance machine learning model 140 determines a transition within the presentation based upon user inputs specifying a transition. FIG. 2A depicts one example use case in which an example client device 200 displays an example user interface of a presentation program executed in a rehearsal mode for rehearsing a presentation. A rehearsal of the presentation may involve a user navigating through different portions of the presentation, triggering animations, emphasizing displayed objects and/or performing other transitions while practicing accompanying speech and/or body language. A microphone 220 of the client device 200 receives audio data during the rehearsal. In some examples, a camera 222 of the client device 200 also receives image data during the rehearsal. In this example, a touchscreen of the client device 200 receives a presentation program touch input via user finger 234 specifying an "emphasize object" transition by touching the selectable emphasize object button 218 within a transitions menu 236.

Figure 2B:
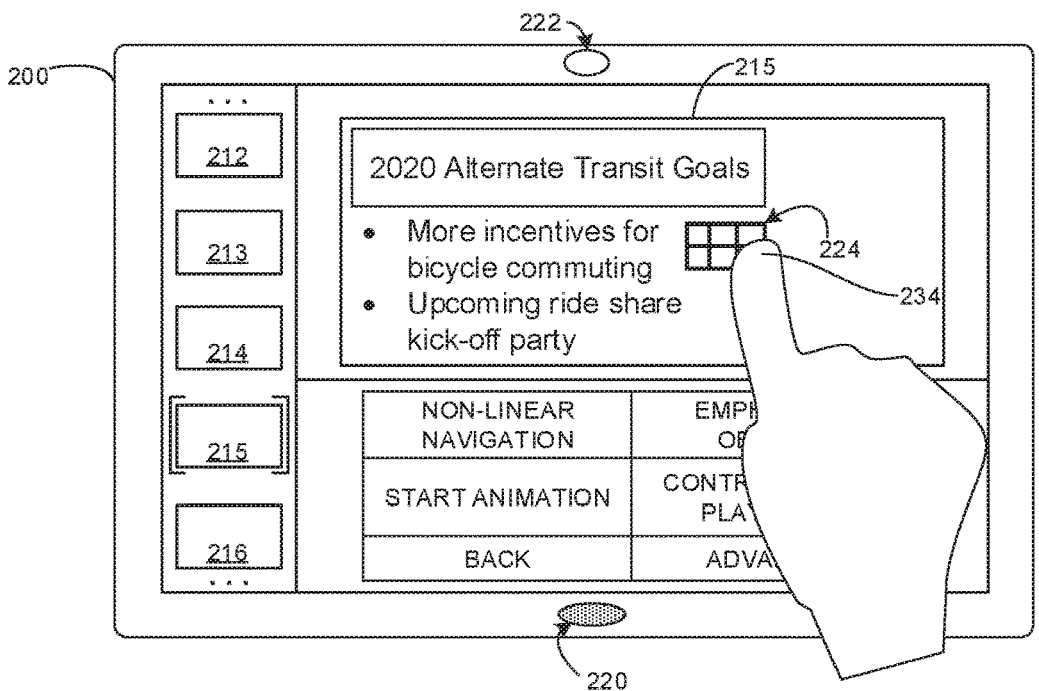
Figure 2C:
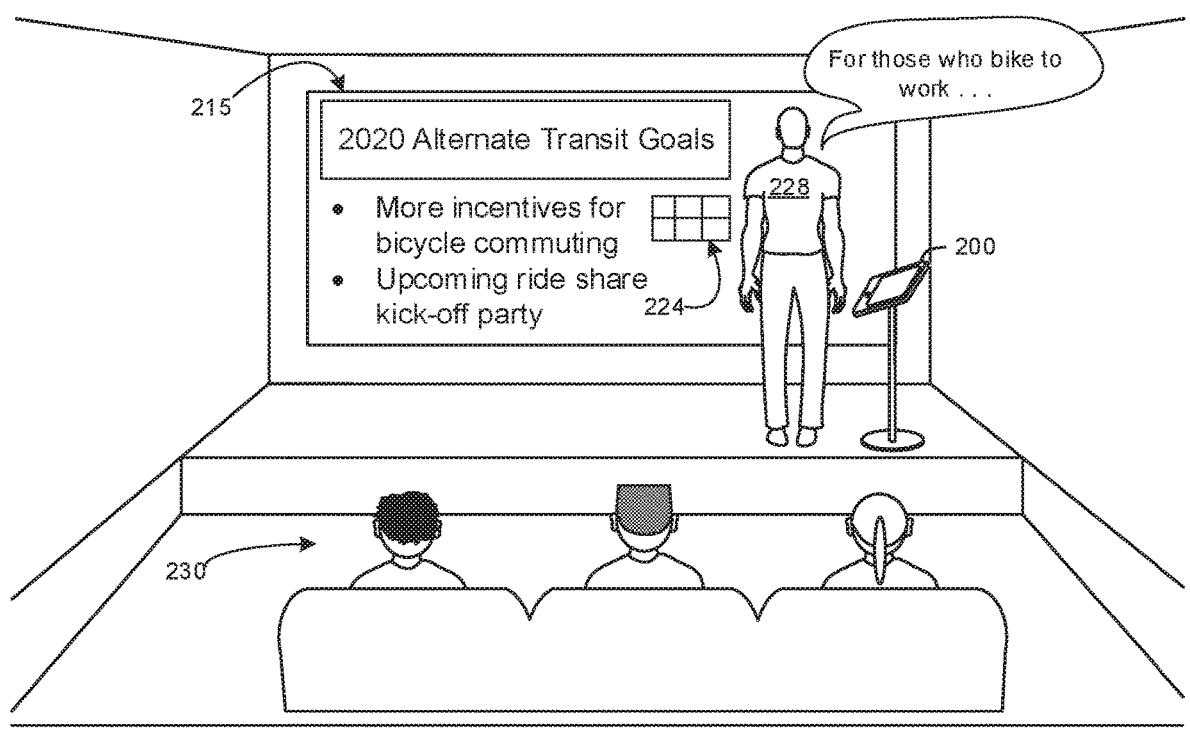
FIGS. 2C-2D schematically show an example use scenario in which a transition, determined via machine learning during the rehearsal shown in FIGS. 2A-2B, is automatically enacted during a performance of the presentation according to examples of the present disclosure.
Figure 2D:
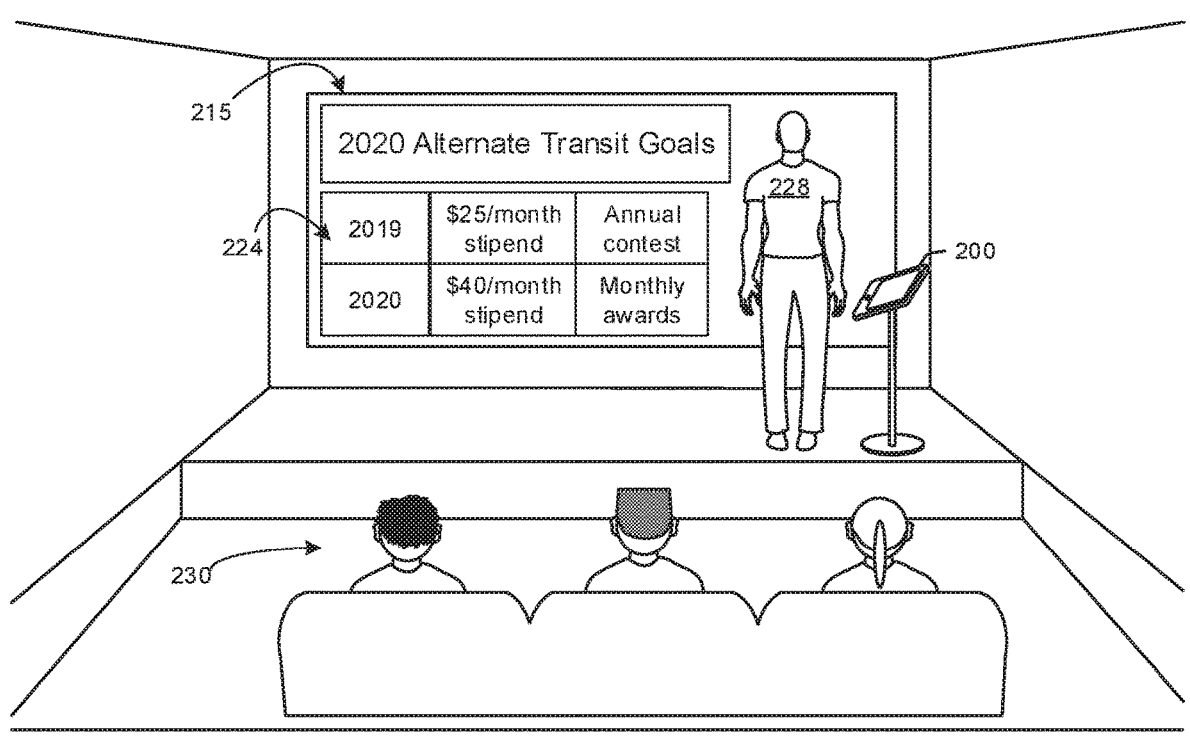

FIG. 2B depicts another example presentation program touch input that specifies the displayed chart 224 as the object to be emphasized. In other examples, any other suitable object within a presentation may be selected for emphasis, including a graph, text, image, etc. Transitions also may be enacted by a variety of other presentation program inputs that cause the desired transition, such as pressing an arrow key on a keyboard to advance a slideshow, or selecting displayed text followed by selecting a highlighting option from a displayed editing menu. As mentioned above, a presentation program input may specify any other transition within a presentation, such as a non-linear navigation to a different portion of a presentation, an animation, or a media control.

The transition-related assistance machine learning model 140 is further configured to associate the transition effected during a rehearsal with a transitional trigger detected within the content 118 received. In some examples in which presentation program input specifying a transition is received, the transition-related assistance machine learning model 140 may determine which user signal(s) (collectively the "transitional trigger") are associated with the transition based upon a temporal relationship between the user signal(s) and the presentation program input. As described below, such transitional triggers are later utilized to automatically enact the transition during a performance of the presentation.

In some examples during a rehearsal, when user signal(s) (such as voice input, physical gestures and/or other user movements) are contemporaneous with the presentation program input that effects a transition (such as advancing to the next slide), the transition-related assistance machine learning model 140 determines a transitional trigger that associates the user signal(s) with the effected transition. In other examples, the transition-related assistance machine learning model 140 may determine a transitional trigger that associates user signal(s) with an effected transition when the user signal(s) occur within a predetermined temporal window as compared to the occurrence of the presentation program input that effects a transition, such as within 1 second, 2 seconds, or other suitable timeframe.

In one example and with reference again to FIG. 2A, the microphone 220 receives audio input 226 including the phrase "For those who bike to work, . . . " while the user's finger 234 taps the emphasize object button 218. Based upon this audio input 226 being received contemporaneously with the presentation program inputs that cause this transition, the transition-related assistance machine learning model 140 determines that the spoken phrase "For those who bike to work, . . . " is a transitional trigger that is associated with the "emphasize chart" transition shown in FIGS. 2A-2B. As described in more detail below, this transitional trigger may be utilized later to automatically enact this transition during a presentation.

As noted above, and in addition or alternatively to audio, other types of user signals may be determined to be transitional triggers and correspondingly mapped to a specified transition. For example, user performance of a gesture and/or a movement (including eye movement) may also be determined to be a transitional trigger and later utilized to enact a transition. In one specific example, a user movement returning to a podium from a location elsewhere on a stage may trigger a navigation transition to a different portion of the presentation. In another specific example, a user pointing to an object or gazing at an object included in the presentation may trigger an emphasis transition emphasizing that object.

Returning to FIG. 1A, in some examples a presentation program input that specifies a transition to occur when the user performs a specified portion of the presentation may be input to the transition-related assistance machine learning model 140 during the rehearsal as initial training data to train the transition-related assistance machine learning model 140. In some examples, a supervised training approach may be used. For example, user signals (spoken phrases, intonations, speech inflections, gestures, body language, etc.) having a determined associated transition based upon an explicit presentation program input may be labeled with the associated transition and used for training the transition-related assistance machine learning model 140. For example and as described above, user signals determined to be transitional triggers 146 may be observed during a rehearsal and labeled based upon a user-initiated presentation program input (transition 148) that is enacted while the user signals are being received. Supervised machine learning may use any suitable classifier, including decision trees, random forests, support vector machines, and/or artificial neural networks.

Unsupervised machine learning also may be used, in which user signals may be received as unlabeled data, and patterns are learned over time. Examples of suitable unsupervised machine learning algorithms include K-means clustering models, Gaussian models, and principal component analysis models, among others. Such approaches may produce, for example, a cluster, a manifold, or a graph that may be used to make predictions related to contexts in which a user may wish to perform a transition 148 within a presentation. Such predictions may be utilized to determine corresponding transitional triggers 146.

In some examples, the transition-related assistance machine learning model 140 may use an ensemble of techniques to generate If-Then statements and/or derive an intent from the text received from the voice listener. For example, such techniques include a recurrent neural network (RNN) architecture in the form of a long short-term memory (LSTM) network and/or a logistic regression model. In some examples, a graph long short-term memory (graph LSTM) neural network may be utilized to extract semantic meanings from received text and relationships between words that are inherent to natural language. For example, text (textual data 122, transcription of audio data 128 received from the transcription service 132, etc.) may be parsed using a graph LSTM neural network to extract cross-sentence n-ary relationships using several graph LSTM units arranged according to the syntactic relations of terms in the segment of text. These syntactic relationships between words may be tracked in the graph LSTM neural network to allow artificial intelligence and machine learning techniques to identify entities and their context within the text and from the grammatical structure in which they exist.

In some examples in which a user does not provide presentation program input specifying a transition, the transition-related assistance machine learning model 140 may still recommend a transition based upon observations and/or user feedback. For example, the transition-related assistance machine learning model 140 may determine a potential transition to a navigate to a different portion of a presentation based upon a speech inflection indicative of a question that contextually leads into the other portion of the presentation. Using this determination, the transition-related assistance machine learning model 140 may recommend a navigational transition tied to this speech inflection (e.g., a potential transitional trigger), request user feedback regarding the recommended transition, and use the user feedback to determine whether or not to create a transitional trigger that associates the inflected speech with the navigation transition.

Training data used for initial and/or subsequent training of the transition-related assistance machine learning model 140 may include other transitional triggers and associated transitions performed by other users. For example, the transition-related assistance machine learning model 140 may be trained initially using training data for a population generally. Supervised and/or unsupervised training during a rehearsal of a presentation by a particular user may further train the transition-related assistance machine learning model 140 to recognize intended transitions for this particular user.

Figure 1B:
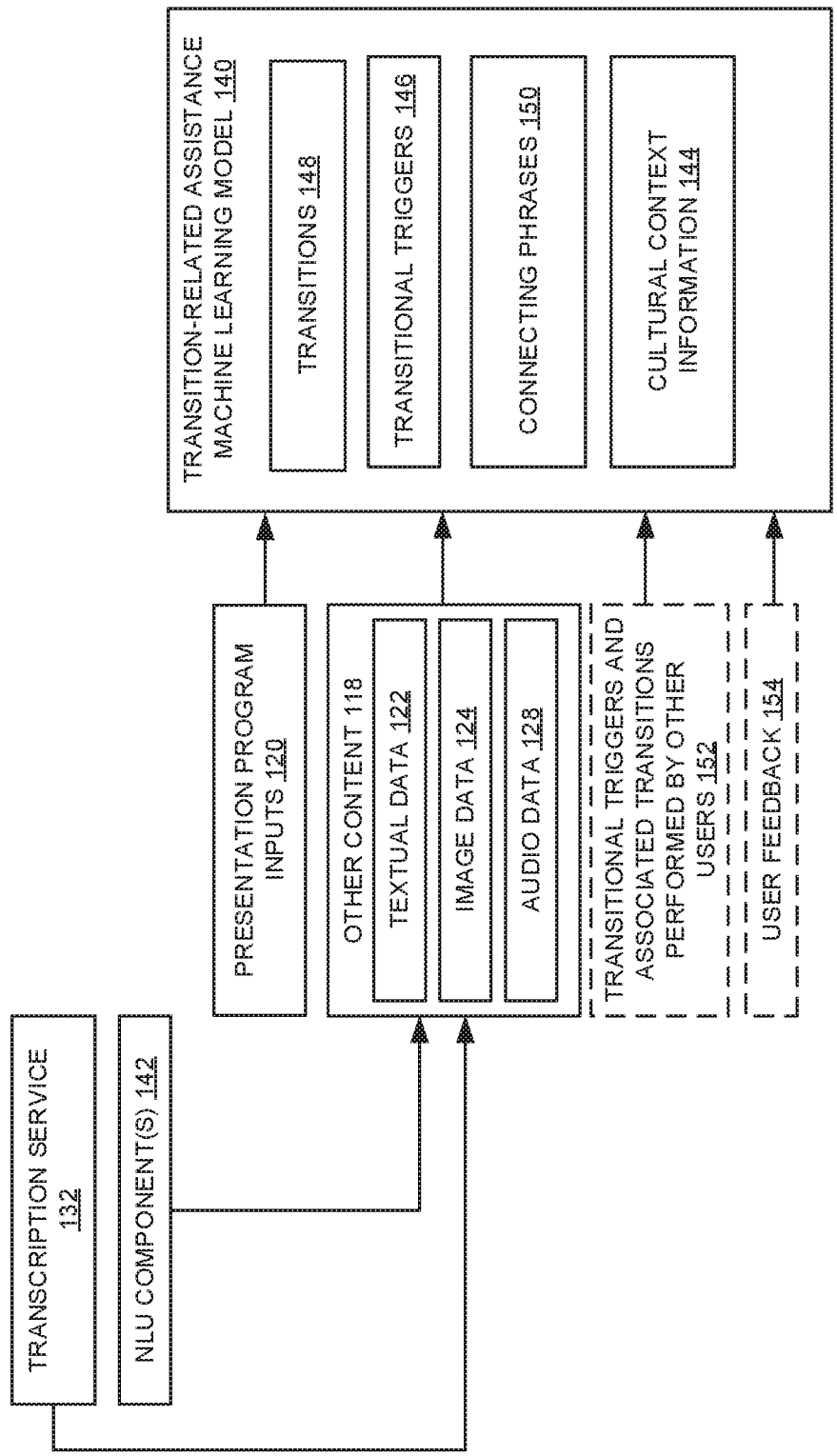
FIG. 1B illustrates an example data flow with respect to a transition-related assistance machine learning model according to examples of the present disclosure.

FIG. 1B depicts an example data flow for training a transition-related assistance machine learning model 140. During a rehearsal, the transition-related assistance machine learning model 140 receives data of one or more presentation program inputs 120 that each specify a transition 148 within a presentation. The transition-related assistance machine learning model 140 also receives input of other content 118, such as audio data 128, image data 124, and/or textual data 122, of the presentation during the rehearsal, as described above. The translation-related assistance machine learning model 140 may leverage internal or external resources, such as the gesture recognition engine 138, NLU component(s) 142, transcription service 132, and/or semantic understanding component(s) 143, to analyze the content received. For example, an NLU component may be used to identify a speech characteristic(s) within the audio data 128.

Using one or more of the audio data 128, image data 124, and textual data 122, the transition-related assistance machine learning model 140 determines a transitional trigger 146 associated with a transition 148. As described above, the transition-related assistance machine learning model 140 may determine an associated transitional trigger based upon a temporal relationship to the presentation program input. The transitional trigger 146 and corresponding transition 148 are input to the transition-related assistance machine learning model 140 as training data for training the transition-related assistance machine learning model 140.

Figure 1C:
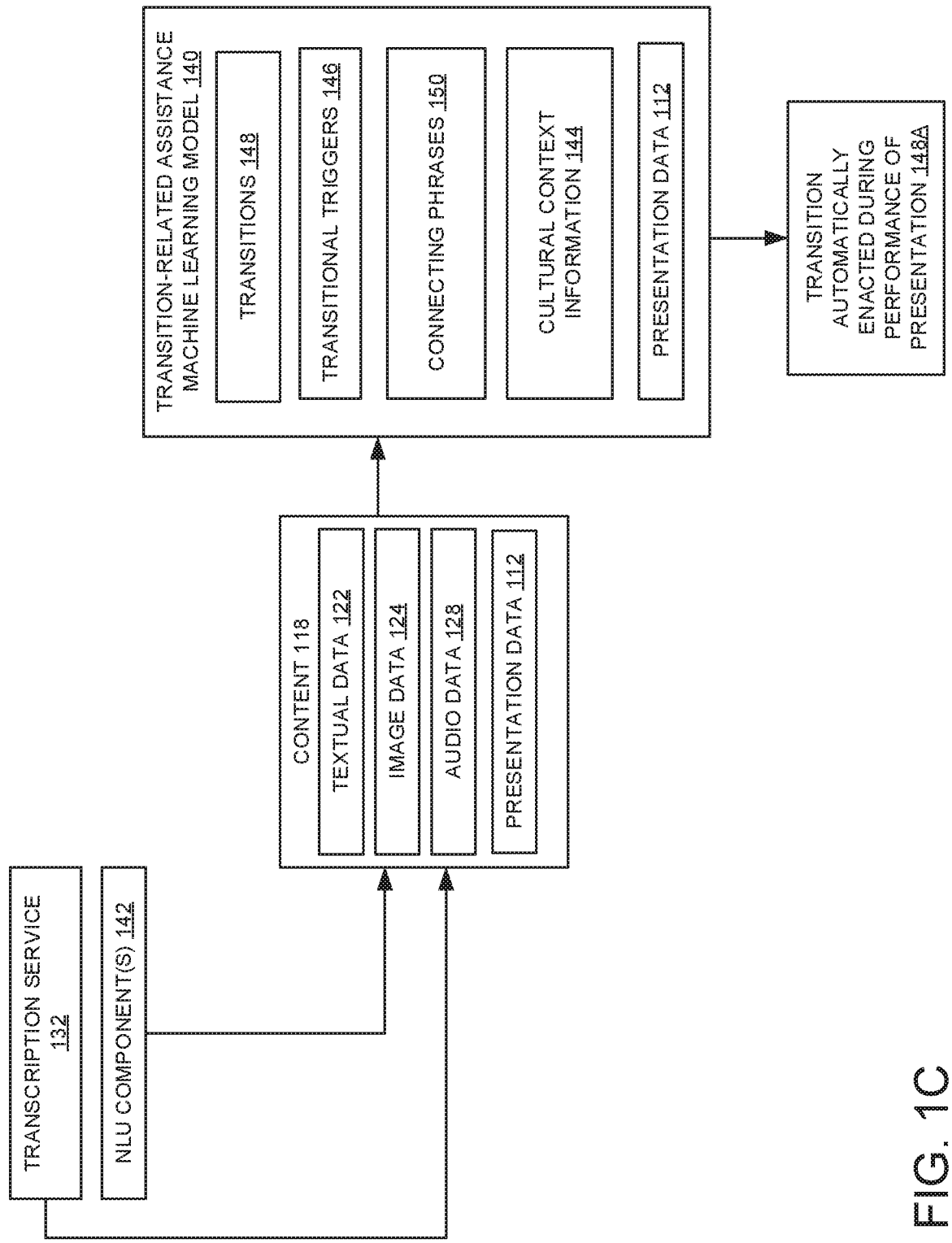
FIG. 1C illustrates another example data flow with respect to a transition-related assistance machine learning model according to examples of the present disclosure.

With reference now to FIG. 1C, and as described in more detail below, during a user's performance of a rehearsed presentation, the transition-related machine-learning model 140 receives content 118, including audio data 128 and/or image data 124 of the user performing the presentation. The transition-related machine-learning model 140 also may receive and/or access presentation data 112, such as textual data, image data and/or audio data, being delivered by the presentation program 110 in the presentation mode 116. Using such content 118 and during the presentation, the transition-related machine-learning model 140 identifies a user's performance of a previously-determined transitional trigger 146, and outputs to the presentation program a corresponding transition 148A that is automatically enacted on behalf of the user.

As described in more detail below, user feedback 154 regarding machine-detected transitions, as well as transitional triggers and associated transitions performed by other users 152, may also be input as training data for training the transition-related assistance machine learning model 140. Training data obtained from other users may help to enhance cultural context information 144 available to the transition-related assistance machine learning model 140, whereas user feedback 154 may help to improve accuracy of transition assistance provided by the transition-related assistance machine learning model 140 for a particular user.

In some examples, a user may rehearse a presentation two or more times, and a collection of user signals obtained from the two or more rehearsals may be used to enact a transition within the presentation. In a more specific example, during a first rehearsal, a user may utter the phrase "to start" and contemporaneously provide a user input specifying an "advance" transition to advance to a different portion of the presentation. At the same portion of the presentation, during a different rehearsal, the user may slightly improvise her script and utter the phrase "as an introduction" rather than "to start", and again select the "advance" transition. Based on these and possibly other rehearsals, the transition-related assistance machine learning model 140 learns that the phrases "to start" and "as an introduction" are equivalent and part of a collection of user signals that may trigger automatic advancing to a different portion of the presentation during a later performance of the presentation. Accordingly, the transition-related assistance machine learning model 140 may designate both phrases "as an introduction" and "to start" as transitional triggers for this particular navigational transition. In this manner, if the user improvises or otherwise does not follow a script verbatim during a performance of the presentation, the transition-related assistance machine learning model 140 may still be able to automatically enact intended transitions on behalf of the user.

In some examples, the transition-related assistance machine learning model 140 may recognize that a transitional trigger and/or a transition is inappropriate. For example, the transition-related assistance machine learning model 140 may leverage the cultural context information 144 to determine a spoken phrase and/or gesture used as a transitional trigger is culturally insensitive. The transition-related assistance machine learning model 140 then accesses the culture context information 144 to determine an alternate transitional trigger, such as a phrase having similar substance and a culturally acceptable connotation, and presents the alternate transitional trigger to a user (e.g. by displaying the suggested phrase).

The transition-related assistance machine learning model 140 also may recommend a new or alternate transitional trigger based on detecting no use of a transitional trigger or use of a low-quality transitional trigger in a rehearsal. For example, the transition-related assistance machine learning model 140 may detect repetitive use of the same phrase or a lack of contextual lead-in to a transition between portions of a presentation that describe different subject matter. In such instances, the transition-related assistance machine learning model 140 may leverage a semantic understanding component(s) 143 to semantically understand the portions of the presentation involved in the transition. When the content obtained from the portions of the presentation is semantically understood, the transition-related assistance machine learning model 140 may use the semantic meaning of the content to determine a transitional trigger 146, such as a connecting phrase 150, that could be used when transitioning between the portions. The transition-related assistance machine learning model 140 may then recommend the connecting phrase to the user (such as by displaying the recommended phrase along with a suggestion to use it in connection with this transition).

Figure 3:
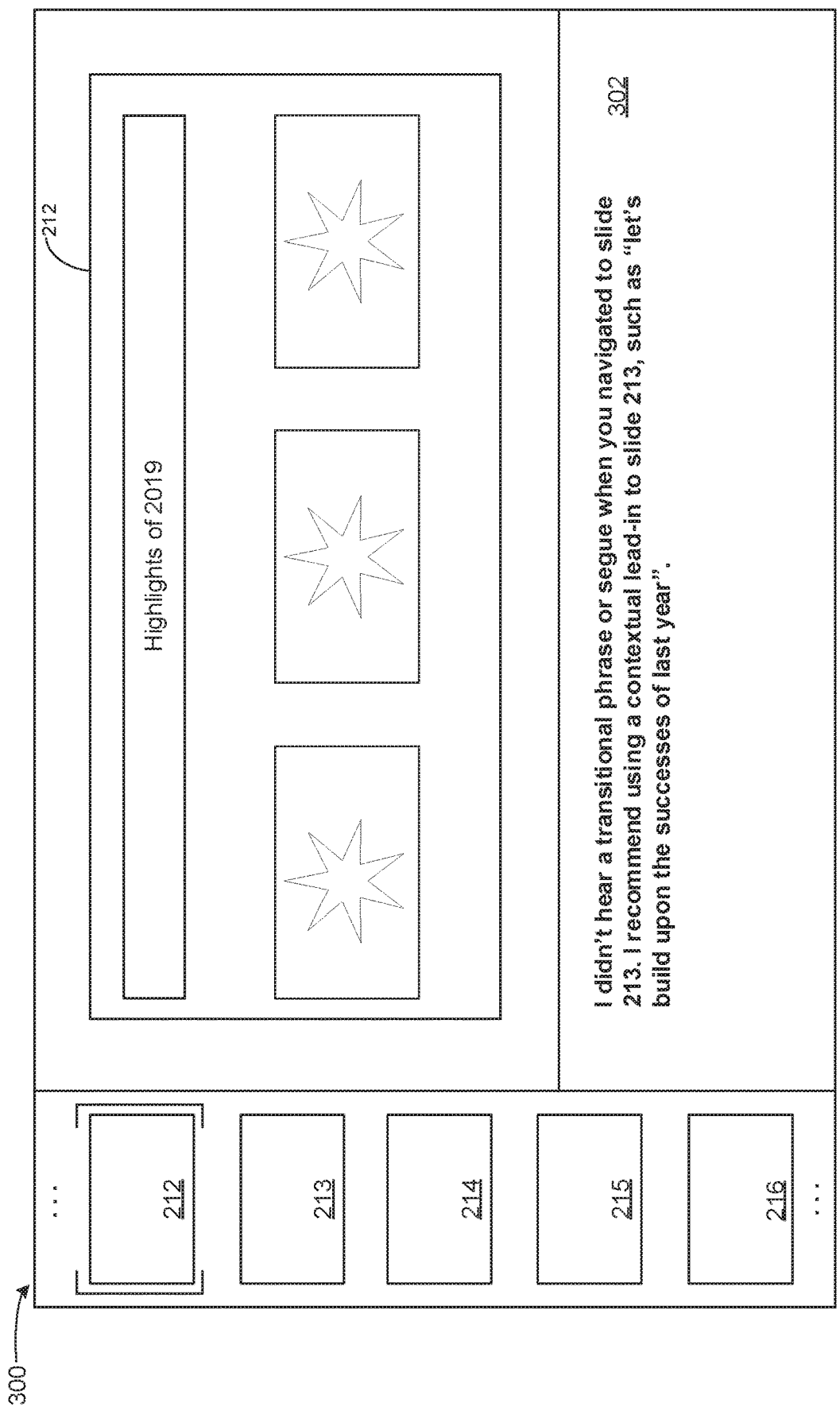
FIG. 3 schematically shows an example user interface for presenting a possible transitional trigger to a user during a rehearsal according to examples of the present disclosure.

FIG. 3 depicts an example user interface 300 of a presentation program during a rehearsal in which the transition-related assistance machine learning model 140 recommends a connecting phrase for a transition upon detecting no use of a transitional trigger. In this example, the user is rehearsing a slide 212 titled "Highlights of 2019." During the rehearsal, the transition-related assistance machine learning model 140 determines a semantic meaning of the portion 212 being rehearsed, as well as semantic meanings of other portions of the presentation via the semantic understanding component(s) 143. Based on determining a semantic understanding of the text "Highlights of 2019" in slide 212 and a title "Vision for 2020" in the next slide 213, the transition-related assistance machine learning model 140 may determine that the phrase "let's build upon the successes of last year" is a possible contextual lead-in (and transitional trigger) to slide 213. In FIG. 3, this determined potential transitional trigger is displayed on the user interface 300 in a transition-related assistance pane 302, to recommend the transitional trigger to the user. In other examples, a recommended transitional trigger may be presented to the user in any other suitable manner, e.g. via a pop-up notification. The transition-related assistance machine learning model 140 also may alert a user to repetitive or otherwise nonideal transitional triggers, and suggest potential alternate transitional triggers.

As mentioned above, user feedback during a rehearsal may help to further train the transition-related assistance machine learning model 140. In some examples during a rehearsal, the transition-related assistance machine learning model 140 may automatically detect and enact one or more possible transitions within a presentation, e.g. based upon user signals, a semantic understanding of presentation data, etc. In some examples, the transition-related assistance machine learning model 140 may leverage cultural context information 144 to automatically detect and enact a possible transition(s) based upon a specific geographical location of the presentation.

When possible transition(s) are detected during a rehearsal, the transition-related assistance machine learning model 140 may present the possible transition(s) and associated transitional trigger(s) to a user, e.g. via a user interface, and request feedback regarding user intent to perform the possible transition(s). A user input confirming an intent to perform one of the possible transitions when the user performs the transitional trigger(s) may be labeled as training data to train the transition-related assistance machine learning model 140. Likewise, a user input specifying an alternate transition that is different than the suggested possible transition(s) may be input as training data to train the transition-related assistance machine learning model 140.

When a possible transition is automatically detected and enacted, the transition-related assistance machine learning model 140 may request user feedback regarding accuracy of the transition. For example and returning to FIG. 3, in an example where the user speaks the phrase "let's build upon the successes of last year" (instead of no transitional trigger) in a rehearsal, the transition-related assistance machine learning model 140 may detect this phrase as a transitional trigger and automatically enact a transition from slide 212 to slide 213. Further, the transition-related assistance machine learning model 140 may request user feedback regarding whether the automatically enacted transition was intended to occur, e.g. by displaying radio buttons selectable to answer "YES" or "NO". Selection of the "YES" radio button may confirm that this transition is intended to occur when the user performs the specified phrase "let's build upon the successes of last year." The transition-related assistance machine learning model 140 may label the transitional trigger as associated with this transition and input the labeled data as training data to train the transition-related assistance machine learning model 140.

In contrast, selection of a "NO" radio button may indicate that no transition, or an alternate transition that is different from the possible transition(s), is intended to occur when the user performs the specified phrase "let's build upon the successes of last year." In some examples, selection of the "NO" radio button may trigger presentation of a menu of other possible transitions. User selection of an alternate transition designates the alternate transition as intended to occur in response to user performance of the specified portion of the presentation ("let's build upon the successes of last year").

Figure 4:
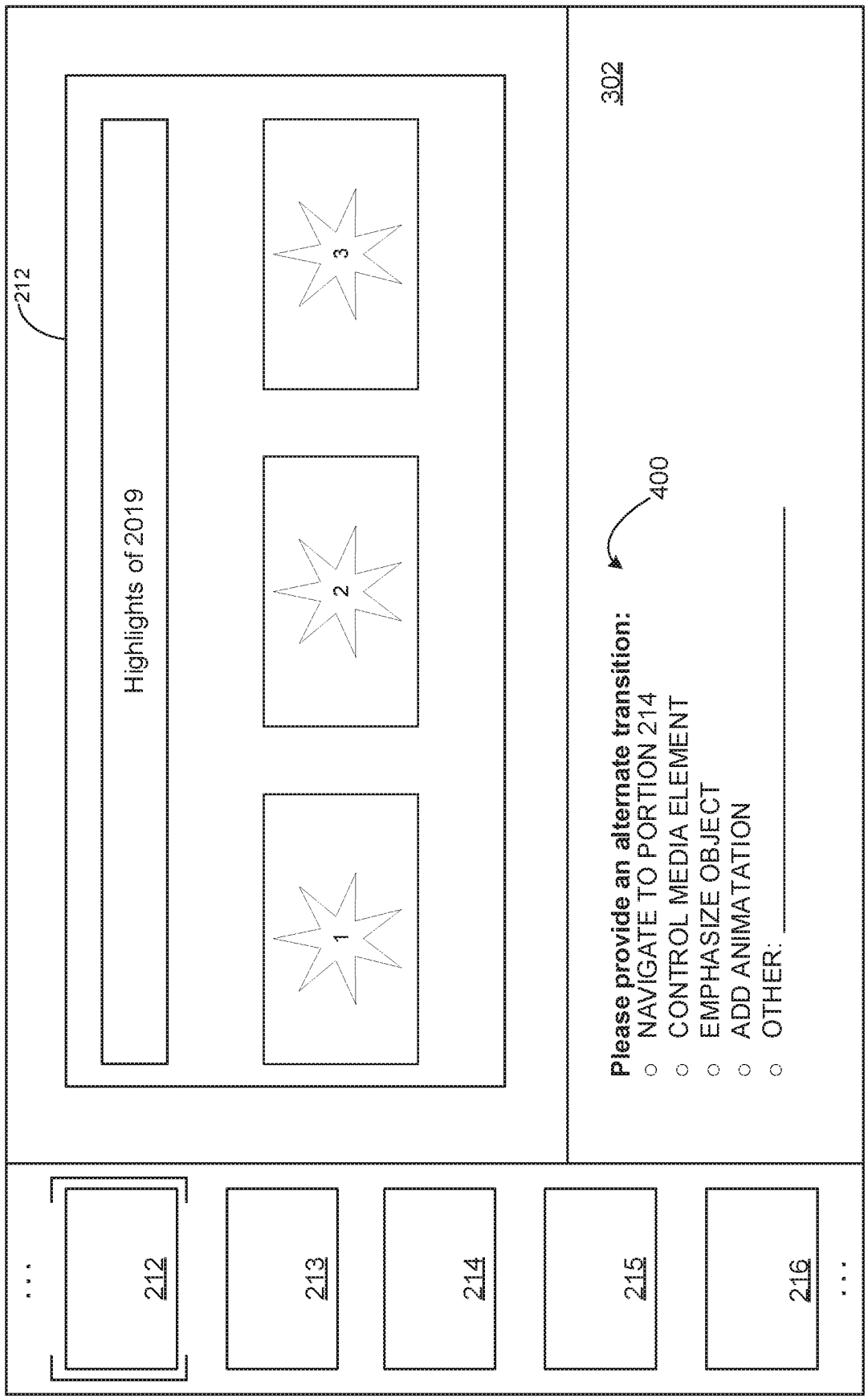
FIG. 4 schematically shows an example user interface for specifying an alternate transition according to examples of the present disclosure.

FIG. 4 depicts an example menu 400 of alternate transitions that may be presented to the user during a rehearsal, e.g. in response to providing user feedback indicating that an automatically enacted transition was not intended to occur. In this example, a user may select a non-linear navigation, a media element control, an object emphasis, an animation, or a custom authored transition. When an input selecting an alternate transition that is different from a recommended possible transition(s) is received, the transition-related assistance machine learning model 140 may label the transitional trigger as associated with the alternate transition and input the labeled data as training data to train the transition-related assistance machine learning model 140.

It will be understood that the radio button examples described above are for illustrative purposes only, and user feedback may be received in any other suitable manner in other examples. For example, a user may instead speak the phrase "YES" or "NO" to confirm or reject an automatically enacted transition.

After one or more rehearsals, a presenter may deliver a presentation using the presentation program in a presentation mode 116. During a performance of the presentation, the transition-related assistance machine learning model 140 is configured to automatically enact one or more transitions learned during the rehearsal(s). With reference again to FIGS. 2C-2D, an example use scenario is depicted in which the user 228, after rehearsing the presentation as described above and shown in FIGS. 2A-2B, performs the presentation in front of an audience 230 while operating the presentation program in a presentation mode. In other examples, a user may deliver a presentation to an inanimate audience, such as a camera recording the presentation.

In FIG. 2C, the user 228 speaks to the audience 230 about subject matter of slide 215 within the presentation. When the user 228 utters the phrase "For those who bike to work . . . ", the transition-related assistance machine learning model 140 recognizes the transitional trigger 146 determined in the rehearsal described above, for example via NLU component(s) 142, and determines that the user has performed the portion of the presentation that is intended to emphasize the chart 224 on slide 215. In response to determining that the user has performed this portion of the presentation that includes the transitional trigger, the transition-related assistance machine learning model 140 automatically enlarges the chart 224, as shown in FIG. 2D. In other examples, the specified portion of the presentation that triggers a transition may include a gesture, a movement to a different location, and/or other user signal (speech characteristic, etc.) in addition or alternately to a spoken phrase.

Figure 5:
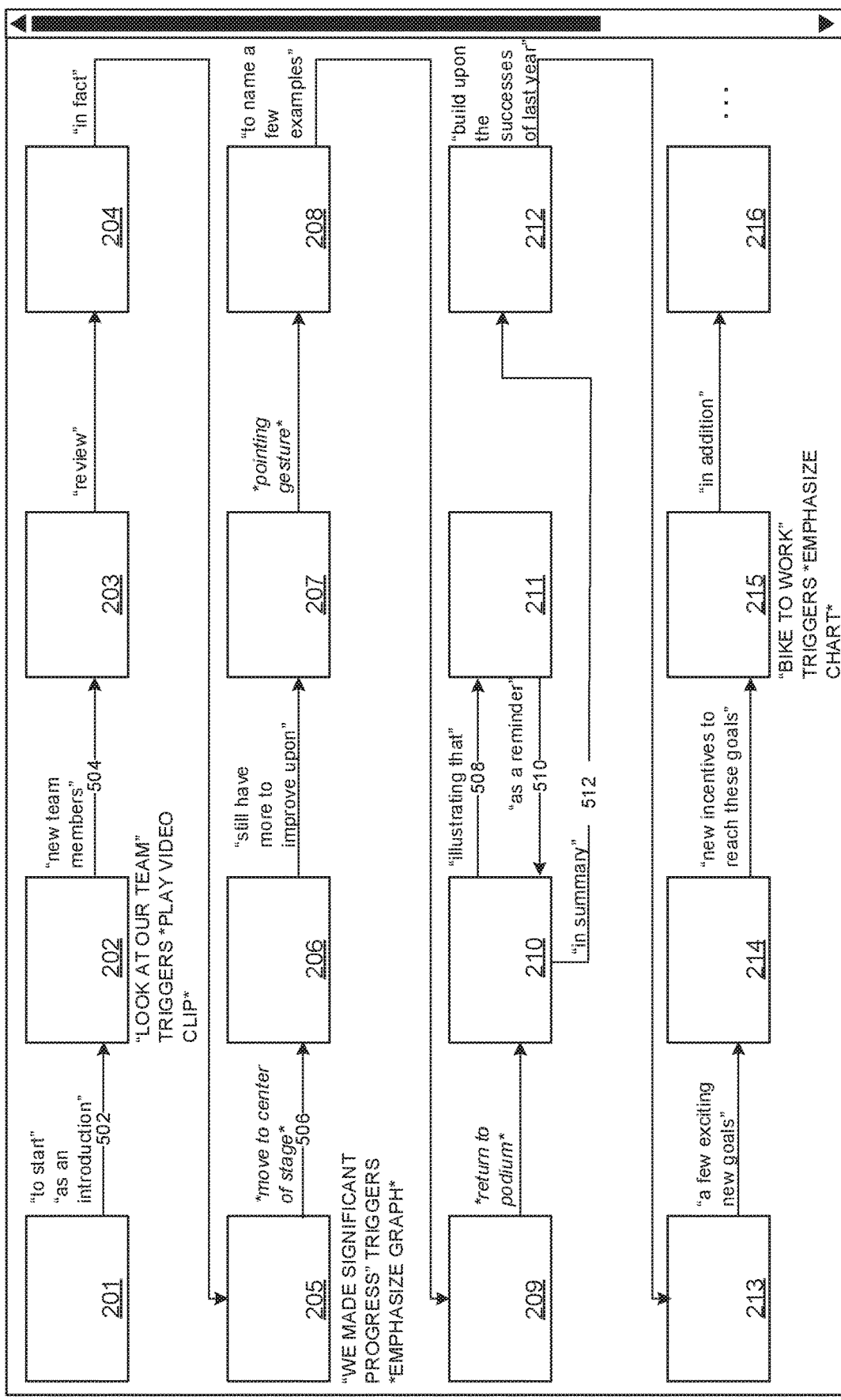
FIG. 5 schematically shows an example presentation preview user interface, which includes transitions within the presentation according to examples of the present disclosure.

With reference now to FIG. 5 and in some examples, a presentation program 110 may include a "presentation preview" user interface (UI) including transitional triggers and associated transitions that a user may access before, during, and/or after a rehearsal. The presentation preview UI may include, for example, features for removing, editing, and/or authoring the transitional triggers and/or the transitions. In the example of FIG. 5, a presentation preview UI 500 displays transitional triggers and associated transitions for one or more portions of a presentation. In the presentation preview UI 500, representations of different slides 201-216 of a presentation are displayed. The slides 201-216 are represented by thumbnail images in FIG. 5, but may be expressed in another format in other examples. In addition to the representations, the presentation preview UI 500 displays transitions within the presentation and associated transitional triggers.

In the presentation preview UI 500, an arrow 502 drawn from slide 201 towards slide 202 of the presentation includes accompanying phrases "to start" and "as an introduction". The arrow 502 represents a transition—a navigation from slide 201 to slide 202—to be automatically enacted by the transition-related assistance machine learning model 140 when a user performs either of the specified phrases "to start" or "as an introduction" (e.g., transitional triggers). As described above, multiple rehearsals may provide a collection of user signals to the transition-related assistance machine learning model 140. In this instance, the multiple phrases which trigger navigation from slide 201 to 202 may, during a performance of the presentation, help to enact the intended navigation transition in an event the user does not recite a rehearsed script verbatim.

Under slide 202 the presentation preview UI 500 also includes the text "look at our team' triggers *play video clip*", indicating a transition that occurs within that portion of the presentation rather than a navigation to a different portion/slide of the presentation. More specifically, text beneath slide 202 indicates that the phrase "look at our team" is a transitional trigger that initiates playback of a video clip embedded in the slide. In other examples, a transition may include any other media control, such as rewind, fast-forward, pause, and adjust volume. Here and elsewhere in FIG. 5, capitalized text located in quotation marks and beneath a representation of a slide is used to express a spoken phrase that triggers a transition within or from the slide, whereas capitalized text located in asterisks and beneath the representation of the slide is used to express the transition. In other examples, a presentation preview UI may indicate that displayed text corresponds to certain user signal(s), or a transition type of an associated transition, in any other manner.

In this example of slide 202, the media control transition may be determined based upon explicit user input during a rehearsal specifying a media control transition (e.g., the user selecting a Play video icon) and the contemporaneous or temporally adjacent spoken phrase "look at our team" being associated as the transitional trigger. In other examples and as described above, any other user signals may be used in addition or alternatively to speech to determine a transitional trigger associated with a specified transition. Examples of other user signals include gestures and movements. In yet other examples, such a transition may be determined based upon observations made by the transition-related assistance machine learning model 140 during a rehearsal without receiving explicit user input specifying a transition.

In addition to a transition within portion 202, the presentation preview UI 500 indicates via arrow 504 that the spoken phrase "new team members" is a transitional trigger that triggers a navigation from slide 202 to slide 203. Here and elsewhere in the example of FIG. 5, the text positioned between quotation marks and above an arrow indicates a spoken phrase transitional trigger and an associated navigation transition.

With reference now to slide 205, the presentation preview UI includes an arrow 506 drawn from slide 205 towards slide 206, and the text *move to center of stage* accompanying arrow 506. The arrow 506 represents a transition—a navigation from slide 205 to slide 206—to be automatically enacted by the transition-related assistance machine learning model 140 when a user performs a movement. Namely, the navigation transition is to be automatically enacted when user movement is determined to satisfy a movement to a center of a stage. Here and elsewhere in the example of FIG. 5, italicized text located between asterisks and above an arrow indicates a gesture and/or movement transitional trigger and an associated navigation transition.

The navigation transition 506 may be determined during a rehearsal based upon observations made by the transition-related assistance machine learning model 140. In some examples, the transition-related assistance machine learning model 140 may analyze image data 124 and/or output from a gesture recognition engine 138 to determine whether user performance of a movement and/or a gesture is associated with a known transition. A gesture and/or movement may be associated with a known transition based upon a previous association of the gesture and/or movement with the transition, during a prior rehearsal(s), via supervised and/or unsupervised training. As another example, a gesture and/or movement may be associated with a known transition based upon learned cultural context information 144 defining gestures and/or movements commonly used to augment speech. Once known, a gesture and/or movement associated with a transition may be stored in memory 106 or other location accessible by the transition-related assistance machine learning model 140.

As mentioned above, a navigation transition from one portion of a presentation to another portion may comprise a non-linear navigation. With reference to slide 210, the text "illustrating that" accompanying arrow 508 indicates a forward navigation transition from slide 210 to slide 211 upon user performance of the spoken phrase "illustrating that." With reference to slide 211, the text "as a reminder" accompanying arrow 510 indicates a navigation transition from slide 211 to earlier slide 210 upon user performance of the spoken phrase "as a reminder." With reference again to slide 210, the text "in summary" accompanying arrow 510 indicates a non-linear transition from slide 210 to slide 212, without transitioning through intervening slide 211. In this manner and in contrast with existing presentation methods in which a user manually clicks to transition forward/backwards to adjacent slides/portions of a presentation, the transition-related assistance machine learning model 140 is configured to identify and enact navigational transitions to any portion of a presentation.

With reference now to slide 215, the presentation preview UI includes the text 'bike to work' triggers 'emphasize chart' beneath a representation of slide 215. This text indicates a transition that occurs within slide 215 of the presentation, namely, an emphasis of a chart included in slide 215. In other examples, a transition may emphasize any other object within the presentation data for a presentation, including a graph, an image, and text. Examples of emphasis that may be performed during the transition include highlighting, outlining, enlarging, zooming, and the like.

The emphasize chart transition for slide 215 may be determined based upon explicit user input(s) received during a rehearsal, specifying an emphasize transition (e.g. transition 218 in FIG. 2A) and/or specifying an object for emphasis (e.g. chart 224 in FIG. 2B) and the contemporaneous or temporally adjacent spoken phrase "bike to work." In other examples, any other user signals, in addition or alternatively to a spoken phrase, may be used to determine a transitional trigger associated with the specified transition. Examples of other user signals include speech characteristics, gestures, and movements. In yet other examples, such a transition may be determined based upon observations made by the transition-related assistance machine learning model 140 during a rehearsal(s) without receiving explicit user input specifying a transition. For example, user signals that include a change in speech characteristics, such as faster/slower speech, inflections, a change in volume, and/or intonations, may indicate that a user intends to emphasize a current element of presentation data.

Figure 6:
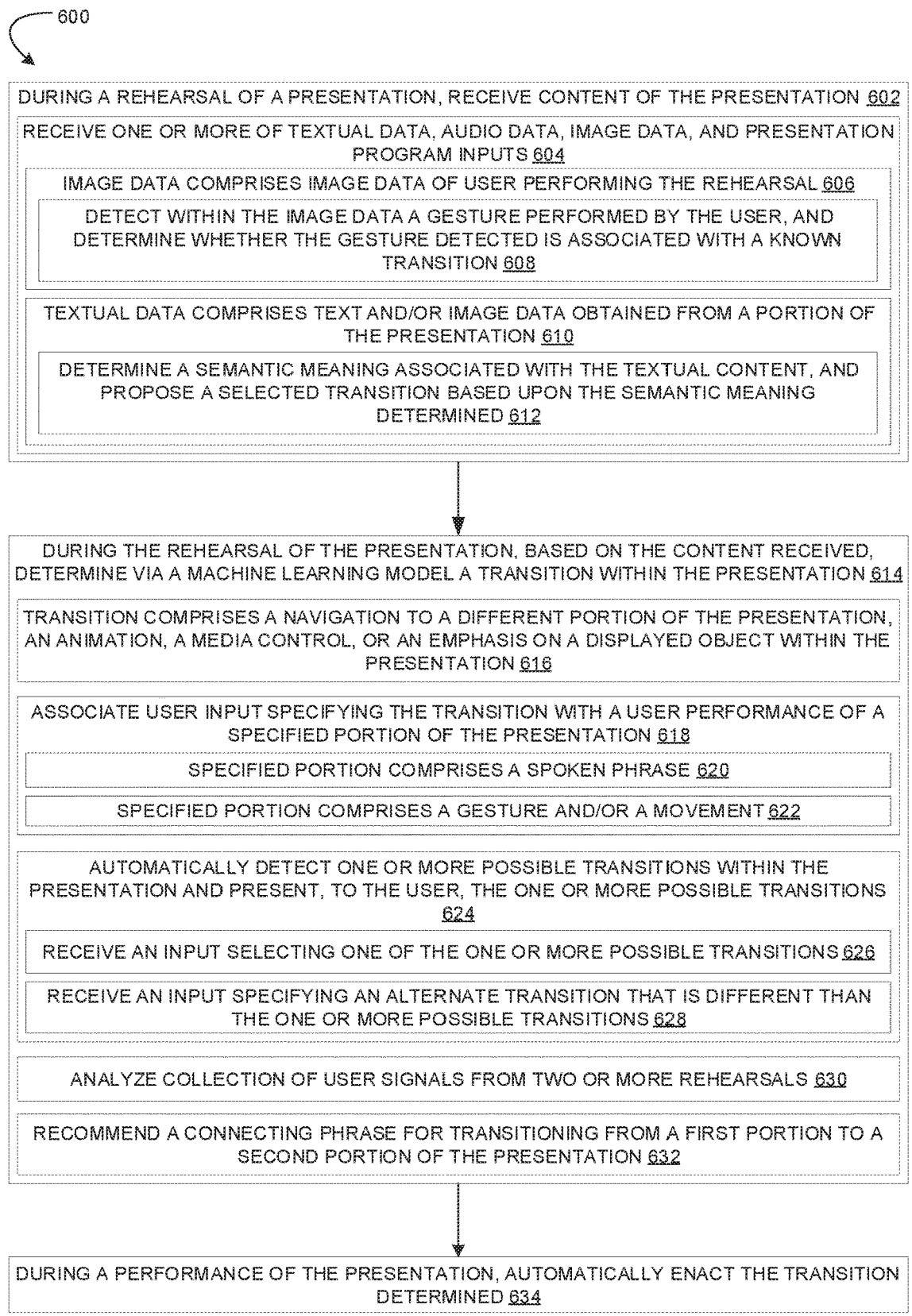
FIG. 6 is a flowchart illustrating an example method of providing transition-related assistance during a presentation according to examples of the present disclosure.

FIG. 6 is a flowchart illustrating an example method 600 of providing transition-related assistance during a presentation. Method 600 may be implemented as stored instructions executable by a logic subsystem of a computing system, such as computing system 102, client device 108, client device 200, and/or various combinations of the foregoing.

At 602, method 600 comprises, during a rehearsal of a presentation, receiving content of the presentation. Receiving the content of the presentation may include receiving one or more of textual data, audio data, image data, and presentation program inputs, as indicated at 604. Receiving image data may comprise receiving image data of a user performing the rehearsal, as indicated at 606. In some such examples, method 600 may further comprise detecting, within the image data, a gesture performed by the user, and determining whether the gesture detected is associated with a known transition, as indicated at 608. Receiving textual data may comprise receiving text and/or image data obtained from a portion of the presentation, as indicated at 610. In some such examples, method 600 may further comprise determining a semantic meaning associated with the textual content and proposing a selected transition based upon the semantic meaning determined, as indicated at 612.

At 614, method 600 comprises, during the rehearsal of the presentation, based on the content received, determine via a machine learning model a transition within the presentation. The transition may comprise a navigation to a different portion of the presentation, an animation, a media control, or an emphasis on a displayed object within the presentation, as indicated at 616. When the content received comprises a user input specifying the transition, determining the transition via the machine learning model may comprise associating the user input with a user performance of a specified portion of the presentation, as indicated at 618. The specified portion of the presentation may comprise a spoken phrase 620 (one or more words), a gesture, and/or a movement to a different location 622.

Determining the transition via the machine learning model may comprise, during the rehearsal of the presentation, automatically detecting one or more possible transitions within the presentation and presenting, to the user, the one or more possible transitions, as indicated at 624. The method 600 may further comprise receiving an input selecting one of the one or more possible transitions, as indicated at 626, or receiving an input specifying an alternate transition that is different from the one or more possible transitions, as indicated at 628. When the rehearsal of the presentation comprises two or more rehearsals of the presentation, determining the transition via the machine learning model may comprise analyzing a collection of user signals from the two or more rehearsals, as indicated at 630.

Method 600 may comprise, based upon the content received, recommending a connecting phrase for transitioning from a first portion to a section portion of the presentation, as indicated at 632. Method 600 further comprises, at 634, during a performance of the presentation, automatically enacting the transition.

Figure 7:
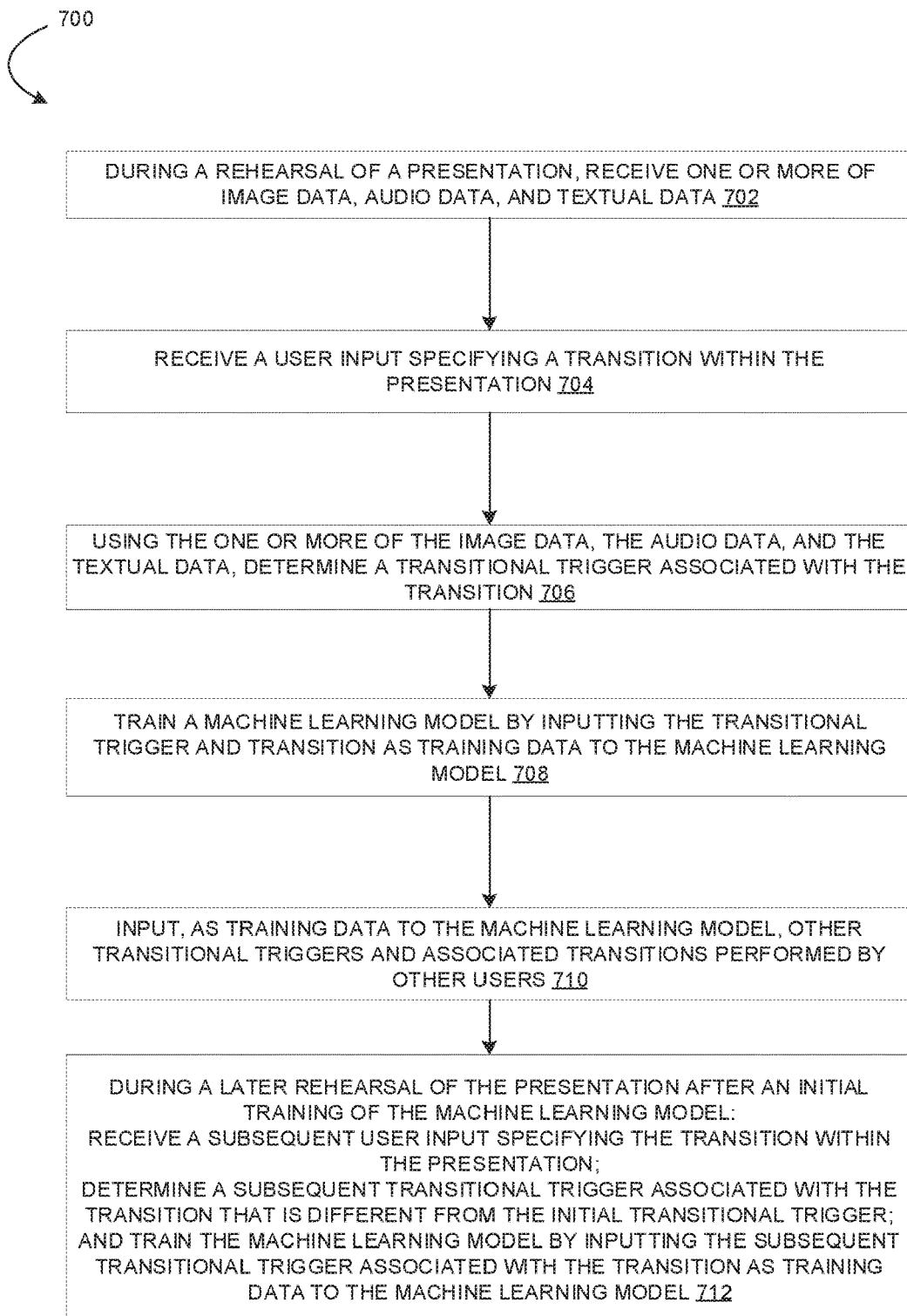
FIG. 7 is a flowchart illustrating an example method of training a machine learning model according to examples of the present disclosure.

FIG. 7 illustrates an example method 700 of training a machine learning model. Method 700 may be implemented as stored instructions executable by a logic subsystem of a computing system, such as computing system 102, client device 108, client device 200, and/or various combinations of the foregoing.

At 702, method 700 comprises, during a rehearsal of a presentation, receiving one or more of image data, audio data, and textual data. At 704, method 700 comprises receiving a user input specifying a transition within the presentation. Using the one or more of the image data, the audio data, and the textual data, method 700 comprises, at 706, determining a transitional trigger associated with the transition. At 708, method 700 comprises training the machine learning model by inputting the transitional trigger and the transition as training data to the machine learning model.

In some examples, method 700 may comprise inputting, as training data to the machine learning model, other transitional triggers and associated transitions performed by other users, as indicated at 710. Further, in some examples, the training of the machine learning model by inputting the transitional trigger and the transition is an initial training of the machine learning model, and the transitional trigger is an initial transitional trigger. In some such examples, method 700 may further comprise, at 712, during a later rehearsal of the presentation after the initial training of the machine learning model: receiving a subsequent user input specifying the transition within the presentation, determining a subsequent transitional trigger associated with the transition that is different from the initial transitional trigger, and training the machine learning model by inputting the subsequent transitional trigger associated with the transition as training data to the machine learning model.

In some embodiments, the methods and processes described herein may be tied to a computing system of one or more computing devices. In particular, such methods and processes may be implemented as a computer-application program or service, an application-programming interface (API), a library, and/or other computer-program product.

Figure 8:
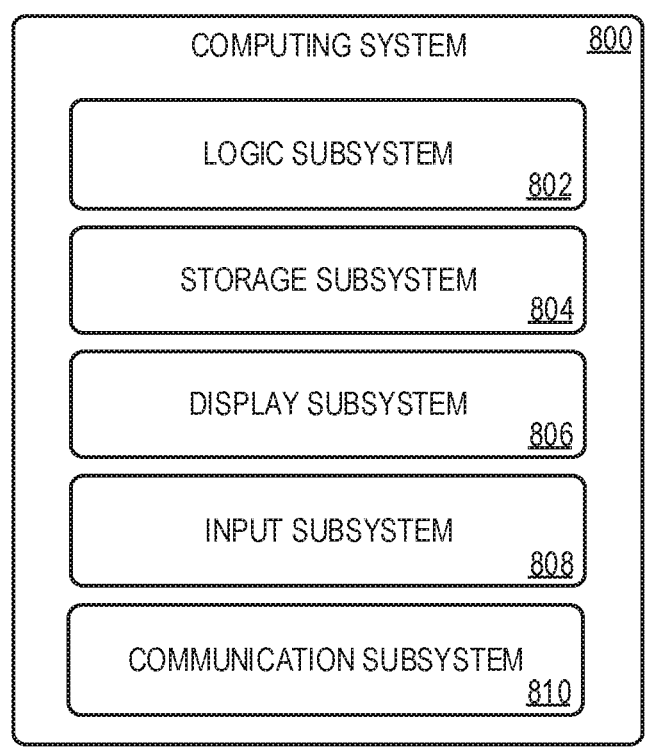
FIG. 8 is a block diagram illustrating an example computing system according to examples of the present disclosure.

FIG. 8 schematically shows a non-limiting embodiment of a computing system 800 that can enact one or more of the methods and processes described above. Computing system 800 is shown in simplified form. Computing system 800 may take the form of one or more personal computers, server computers, tablet computers, home-entertainment computers, network computing devices, gaming devices, mobile computing devices, mobile communication devices (e.g., smart phone), and/or other computing devices.

Computing system 800 includes a logic subsystem 802 and a storage subsystem 804. Computing system 800 may optionally include a display subsystem 806, input subsystem 808, communication subsystem 810, and/or other components not shown in FIG. 8.

Logic subsystem 802 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic machines configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Storage subsystem 804 includes one or more physical devices configured to hold instructions executable by the logic subsystem to implement the methods and processes described herein. When such methods and processes are implemented, the state of storage subsystem 804 may be transformed—e.g., to hold different data.

Storage subsystem 804 may include removable and/or built-in devices. Storage subsystem 804 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage subsystem 804 may include volatile, nonvolatile, dynamic, static, read/write, read-only, random-access, sequential-access, location-addressable, file-addressable, and/or content-addressable devices.

It will be appreciated that storage subsystem 804 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 802 and storage subsystem 804 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 800 implemented to perform a particular function. In some cases, a module, program, or engine may be instantiated via logic subsystem 802 executing instructions held by storage subsystem 804. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 806 may be used to present a visual representation of data held by storage subsystem 804. This visual representation may take the form of a graphical user interface (GUI). As the herein described methods and processes change the data held by the storage subsystem, and thus transform the state of the storage subsystem, the state of display subsystem 806 may likewise be transformed to visually represent changes in the underlying data. Display subsystem 806 may include one or more display devices utilizing virtually any type of technology. Such display devices may be combined with logic subsystem 802 and/or storage subsystem 804 in a shared enclosure, or such display devices may be peripheral display devices.

When included, input subsystem 808 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 810 may be configured to communicatively couple computing system 800 with one or more other computing devices. Communication subsystem 810 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 800 to send and/or receive messages to and/or from other devices via a network such as the Internet.

Another example provides, at a computing system, a method of providing transition-related assistance during a presentation, the method comprising, during a rehearsal of the presentation, receiving content of the presentation, and based on the content received, determining via a machine learning model a transition within the presentation, and during a performance of the presentation, automatically enacting the transition. In such an example, receiving the content of the presentation may additionally or alternatively comprise receiving from a user during the rehearsal a user input specifying the transition, and determining the transition via the machine learning model may additionally or alternatively comprise associating the user input with a user performance of a portion of the presentation. In such an example, the portion of the presentation may additionally or alternatively comprise a spoken phrase. In such an example, the user performance of the portion of the presentation may additionally or alternatively comprise a user performance of a gesture and/or a movement to a different location. In such an example, determining via the machine learning model the transition may additionally or alternatively comprise, during the rehearsal of the presentation, automatically detecting one or more possible transitions within the presentation, and presenting, to the user, the one or more possible transitions. In such an example, the method may additionally or alternatively comprise one of receiving an input selecting one of the one or more possible transitions, and receiving an input specifying an alternate transition that is different from the one or more possible transitions. In such an example, the content received may additionally or alternatively comprise one or more of textual data, audio data, image data, and presentation program input. In such an example, the content may additionally or alternatively comprise the image data, and the image data may additionally or alternatively comprise image data of a user performing the rehearsal of the presentation, the method may additionally or alternatively comprise detecting within the image data a gesture performed by the user, and determining whether the gesture detected is associated with a known transition. In such an example, wherein the content may additionally or alternatively comprise the textual data, and the textual data may additionally or alternatively comprise text and/or image data obtained from a portion of the presentation, the method further may additionally or alternatively comprise determining a semantic meaning associated with the textual data, and recommending a recommended transition based upon the semantic meaning. In such an example, the rehearsal of the presentation may additionally or alternatively comprise two or more rehearsals of the presentation, and determining the transition via the machine learning model may additionally or alternatively comprise analyzing a collection of user signals from the two or more rehearsals. In such an example, the method may additionally or alternatively comprise, based upon the content received, recommending a connecting phrase for transitioning from a first portion to a second portion of the presentation. In such an example, the transition may additionally or alternatively comprise a navigation to a different portion of the presentation, an animation, a media control, or an emphasis on a displayed object within the presentation.

Another example provides a computing system, comprising a logic subsystem, and memory storing instructions executable by the logic subsystem to, while operating a presentation program in a rehearsal mode, receive content of a presentation being rehearsed, and based on the content received, determine via a machine learning model a transition within the presentation, and while operating the presentation program in a presentation mode, automatically enact the transition. In such an example, the instructions executable to receive the content of the presentation may additionally or alternatively be executable to receive one or more of textual data, audio data, image data, and presentation program input. In such an example, the textual data may additionally or alternatively comprise text and/or image data obtained from a portion of the presentation, and the instructions may additionally or alternatively be executable to determine a semantic meaning associated with the textual data, and recommend a recommended transition based upon the semantic meaning. In such an example, the instructions may additionally or alternatively be executable to receive the content of the presentation being rehearsed by receiving, during a rehearsal, a user input specifying the transition, and the instructions may additionally or alternatively be executable to determine the transition via the machine learning model by associating the user input with a user performance of a portion of the presentation, the portion may additionally or alternatively comprise one or more of a spoken phrase, a gesture, and a movement to a different location. In such an example, the instructions may additionally or alternatively be executable to, while operating the presentation program in the rehearsal mode, identify a transitional trigger in the content received, the transitional trigger associated with the transition, determine an alternate transitional trigger for the transition, and present the alternate transitional trigger to a user.

Another example provides, at a computing system, a method of training a machine learning model, the method comprising, during a rehearsal of a presentation, receiving one or more of image data, audio data, and textual data, receiving user input specifying a transition within the presentation, using the one or more of the image data, the audio data, and the textual data, determining a transitional trigger associated with the transition, and training the machine learning model by inputting the transitional trigger and the transition as training data to the machine learning model. In such an example, the user input may additionally or alternatively be performed by a user, the method may additionally or alternatively comprise inputting, as training data to the machine learning model, other transitional triggers and other associated transitions performed by other users. In such an example, the training of the machine learning model by inputting the transitional trigger and the transition may additionally or alternatively be an initial training of the machine learning model, and the transitional trigger may additionally or alternatively be an initial transitional trigger, the method may additionally or alternatively comprise, during a later rehearsal of the presentation after the initial training of the machine learning model, receiving a subsequent user input specifying the transition within the presentation, determining a subsequent transitional trigger associated with the transition that is different from the initial transitional trigger, and training the machine learning model by inputting the subsequent transitional trigger associated with the transition as training data to the machine learning model.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. At a computing system, a method of providing transition-related assistance during a presentation, the method comprising:
   during a rehearsal of the presentation,
      receiving content of the presentation, wherein the content comprises a user input specifying a transition, wherein the user input comprises a manual action selected from (1) manually advancing the presentation to a later portion of the presentation or to a previous portion of the presentation, (2) manually initiating or stopping playback of a media element, and (3) initiating an animation, and
      based on the content received, determining via a machine learning model the transition within the presentation, wherein determining the transition comprises associating the manual action with a user performance of a portion of the presentation; and
   during a performance of the presentation, automatically enacting the transition when the portion of the presentation is detected.

2. The method of claim 1, wherein the portion of the presentation comprises a spoken phrase.

3. The method of claim 1, wherein the user performance of the portion of the presentation comprises a user performance of a gesture and/or a movement to a different location.

4. The method of claim 1, wherein determining via the machine learning model the transition comprises, during the rehearsal of the presentation:
 automatically detecting one or more possible transitions within the presentation; and
 presenting, to the user, the one or more possible transitions.

5. The method of claim 4, further comprising one of:
 receiving an input selecting one of the one or more possible transitions; and
 receiving an input specifying an alternate transition that is different from the one or more possible transitions.

6. The method of claim 1, wherein the content received comprises one or more of textual data, audio data, image data, and presentation program input.

7. The method of claim 6, wherein the content comprises the image data, and the image data comprises image data of a user performing the rehearsal of the presentation, the method further comprising:
 detecting within the image data a gesture performed by the user; and
 determining whether the gesture detected is associated with a known transition.

8. The method of claim 6, wherein the content comprises the textual data, and the textual data comprises text and/or image data obtained from a portion of the presentation, the method further comprising:
 determining a semantic meaning associated with the textual data; and
 recommending a recommended transition based upon the semantic meaning.

9. The method of claim 1, wherein the rehearsal of the presentation comprises two or more rehearsals of the presentation, and wherein determining the transition via the machine learning model comprises analyzing a collection of user signals from the two or more rehearsals.

10. The method of claim 1, further comprising, based upon the content received, recommending a connecting phrase for transitioning from a first portion to a second portion of the presentation.

11. The method of claim 1, wherein the transition comprises a navigation to a different portion of the presentation, an animation, a media control, or an emphasis on a displayed object within the presentation.

12. A computing system, comprising:
 a logic subsystem; and
 memory storing instructions executable by the logic subsystem to:
  while operating a presentation program in a rehearsal mode,
   receive content of a presentation being rehearsed, wherein the content comprises a user input specifying a transition, wherein the user input comprises a manual action selected from (1) manually advancing the presentation to a later portion of the presentation or to a previous portion of the presentation, (2) manually initiating or stopping playback of a media element, and (3) initiating an animation, and
   based on the content received, determine via a machine learning model the transition within the presentation, wherein determining the transition comprises associating the manual action with a user performance of a portion of the presentation; and
  while operating the presentation program in a presentation mode, automatically enact the transition when the portion of the presentation is detected.

13. The computing system of claim 12, wherein the instructions executable to receive the content of the presentation are executable to receive one or more of textual data, audio data, image data, and presentation program input.

14. The computing system of claim 13, wherein the textual data comprises text and/or image data obtained from a portion of the presentation, and wherein the instructions are further executable to:
 determine a semantic meaning associated with the textual data; and
 recommend a recommended transition based upon the semantic meaning.

15. The computing system of claim 12, wherein
 the portion of the presentation comprises one or more of a spoken phrase, a gesture, and a movement to a different location.

16. The computing system of claim 12, wherein the instructions are executable to, while operating the presentation program in the rehearsal mode:
 identify a transitional trigger in the content received, the transitional trigger associated with the transition;
 determine an alternate transitional trigger for the transition; and
 present the alternate transitional trigger to a user.

17. At a computing system, a method of training a machine learning model, the method comprising:
 during a rehearsal of a presentation:
  receiving one or more of image data, audio data, and textual data;
  receiving user input specifying a transition within the presentation, wherein the user input comprises a manual action selected from (1) manually advancing the presentation to a later portion of the presentation or to a previous portion of the presentation, (2) manually initiating or stopping playback of a media element, and (3) initiating an animation;
  using the one or more of the image data, the audio data, and the textual data and the manual action, determining a transitional trigger associated with the transition;
  training the machine learning model by inputting the transitional trigger and the transition as training data to the machine learning mode; and
 during a performance of the presentation, automatically enacting the transition when the portion of the presentation is detected.

18. The method of claim 17, wherein the user input is performed by a user, the method further comprising inputting, as training data to the machine learning model, other transitional triggers and other associated transitions performed by other users.

19. The method of claim 17, wherein the training of the machine learning model by inputting the transitional trigger and the transition is an initial training of the machine learning model, and the transitional trigger is an initial transitional trigger, the method further comprising, during a later rehearsal of the presentation after the initial training of the machine learning model:
 receiving a subsequent user input specifying the transition within the presentation;

determining a subsequent transitional trigger associated with the transition that is different from the initial transitional trigger; and training the machine learning model by inputting the subsequent transitional trigger associated with the transition as training data to the machine learning model.

20. The method of claim 17, wherein training the machine learning model further comprises associating the manual action with a user performance of a portion of the presentation.

\* \* \* \* \*